US008768404B2

(12) United States Patent
Kono et al.

(10) Patent No.: US 8,768,404 B2
(45) Date of Patent: Jul. 1, 2014

(54) MOBILE RADIO TERMINAL

(75) Inventors: Tatsuya Kono, Tachikawa (JP); Yukio Kagami, Ome (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 1237 days.

(21) Appl. No.: 11/769,311

(22) Filed: Jun. 27, 2007

(65) Prior Publication Data

US 2008/0125115 A1 May 29, 2008

(30) Foreign Application Priority Data

Nov. 27, 2006 (JP) ................................. 2006-319350

(51) Int. Cl.
*H04M 1/00* (2006.01)
*H04M 3/00* (2006.01)
*G01S 3/02* (2006.01)
*H04K 1/00* (2006.01)

(52) U.S. Cl.
USPC ..... 455/550.1; 455/419; 455/418; 455/456.1; 342/450; 342/457; 380/270

(58) Field of Classification Search
USPC .................. 455/419, 418, 410, 456.1, 404.2; 370/331; 342/450, 457; 380/270
See application file for complete search history.

(56) References Cited

U.S. PATENT DOCUMENTS

| 6,138,003 | A | * | 10/2000 | Kingdon et al. | ............... 455/410 |
| 2002/0105927 | A1 | * | 8/2002 | Holma et al. | ................. 370/331 |
| 2003/0054809 | A1 | * | 3/2003 | Bridges et al. | ................ 455/419 |
| 2003/0184474 | A1 | * | 10/2003 | Bajikar | ......................... 342/450 |
| 2005/0153706 | A1 | * | 7/2005 | Niemenmaa et al. | ...... 455/456.1 |
| 2005/0213763 | A1 | * | 9/2005 | Owen et al. | .................. 380/270 |
| 2006/0094415 | A1 | * | 5/2006 | Veron | ............................ 455/419 |

FOREIGN PATENT DOCUMENTS

JP 2000-013846 A 1/2000

* cited by examiner

*Primary Examiner* — Jinsong Hu
*Assistant Examiner* — William Nealon
(74) *Attorney, Agent, or Firm* — Maschoff Brennan

(57) ABSTRACT

When active software makes a request for measuring position information, during roaming, a control unit does not execute GPS measurement, but notifies the software of an error indicating that, for example, measurement is failed, and thereby prevents establishment of communication for a function which cannot be executed by the software.

19 Claims, 3 Drawing Sheets

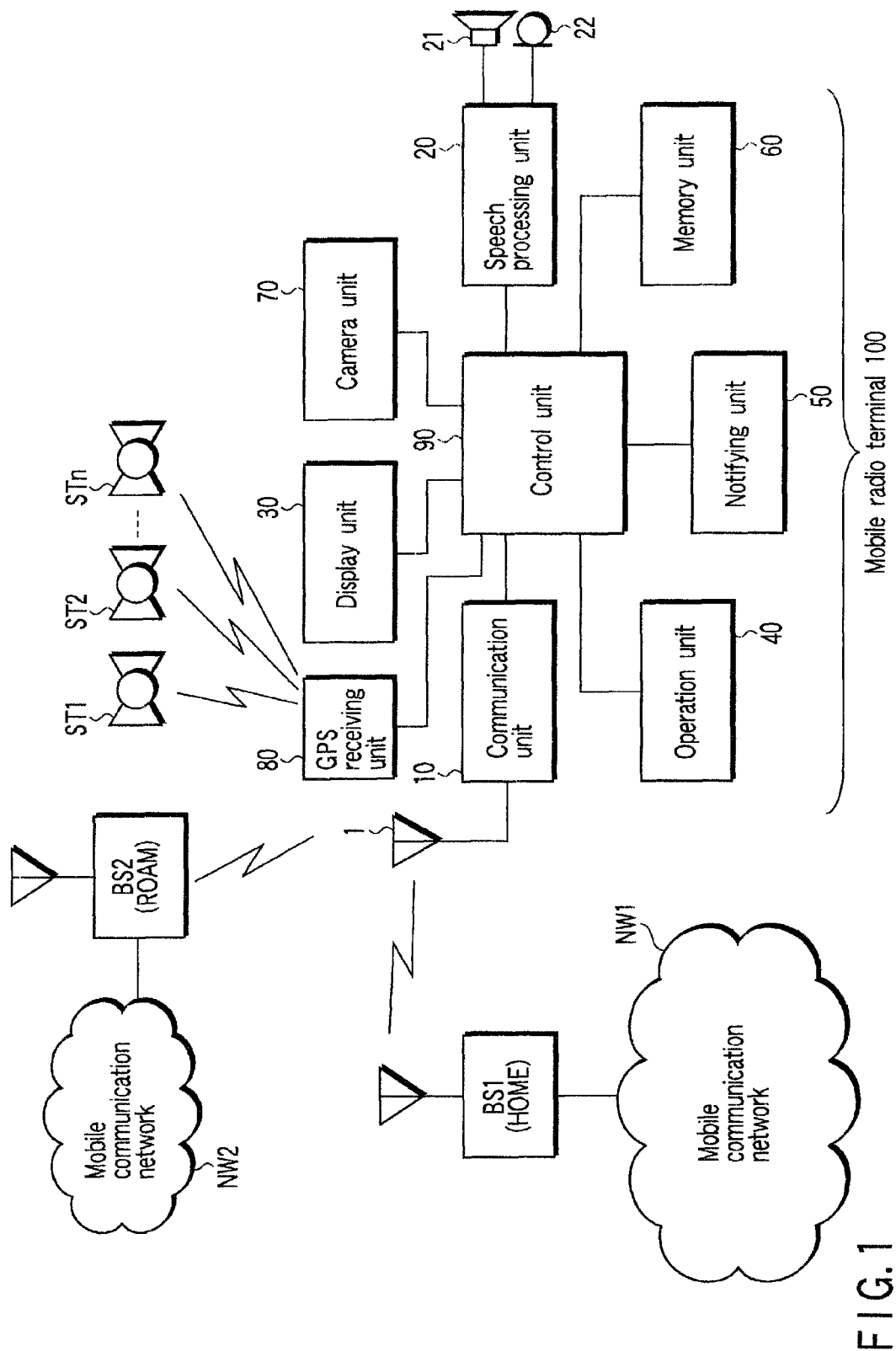
F I G. 1

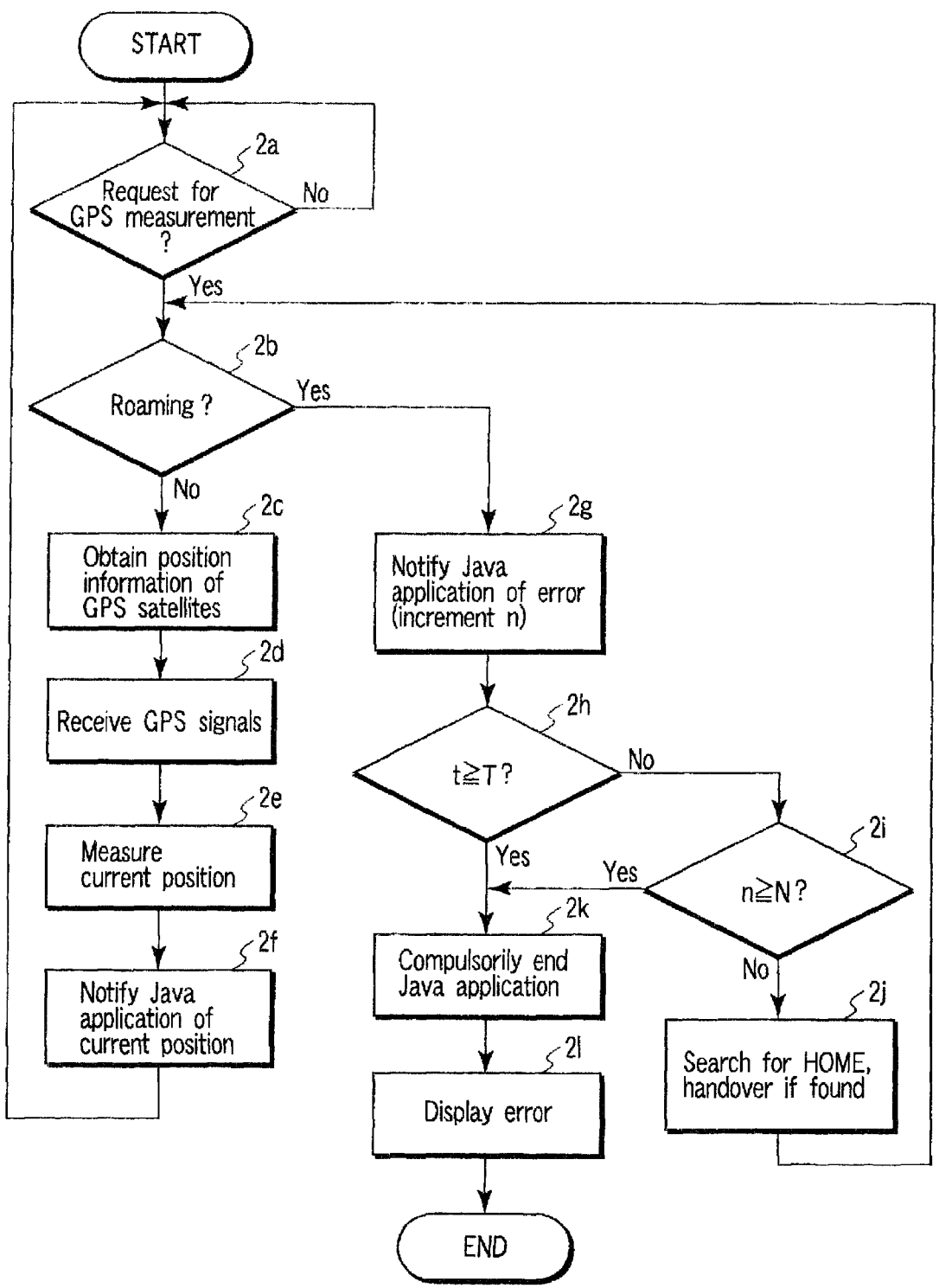
F I G. 2

MOBILE RADIO TERMINAL

CROSS-REFERENCE TO RELATED APPLICATIONS

This application is based upon and claims the benefit of priority from prior Japanese Patent Application No. 2006-319350, filed Nov. 27, 2006, the entire contents of which are incorporated herein by reference.

BACKGROUND OF THE INVENTION

1. Field of the Invention

The present invention relates to a mobile radio terminal employed in a mobile communication system, such as a cellular telephone and the like.

2. Description of the Related Art

A known cellular telephone has a roaming function of establishing communications via a radio base station of a carrier other than other than the carrier with which the user is under contract. If the cellular telephone cannot find the carrier under contract outside the service area, the cellular telephone executes roaming to the other carriers to obtain a cellular telephone service (cf., for example, JP-A No. 2000-13846 (KOKAI)).

However, the cellular telephone has functions which cannot obtain services during the roaming. Thus a problem arises that the cellular telephone establishes communications to obtain the service via radio base stations though the cellular telephone cannot obtain the service and unnecessary communication expenses need to be paid.

After buying a cellular telephone, the user adds functions by arbitrarily installing software such as a Java™ application and the like. However, as such application software is often created without considering roaming, the above problem occurs frequently.

In the conventional mobile radio terminal, although some functions cannot obtain services during the roaming, communications to obtain the services are established and unnecessary communication expenses need to be paid.

BRIEF SUMMARY OF THE INVENTION

The present invention has been accomplished to solve the above-described problems. The object of the present invention is to provide a mobile radio terminal capable of restricting unnecessary communication expenses during the roaming.

To achieve this object, an aspect of the present invention is a mobile radio terminal establishing radio communication with a base station accommodated in a network. The terminal comprises an obtaining unit which obtains position information of the mobile radio terminal, a discrimination unit which discriminates whether or not the base station having the radio connection is a base station to be connected by roaming, during execution of software using the position information obtained by the obtaining unit, and a notification controller which notifies the software that obtaining the position information is failed, if the discrimination unit discriminates that the mobile radio terminal is connected to the roaming base station.

As described above, when it is discriminated that the connected base station is the roaming base station, the present invention notifies the active software that obtaining the position information is failed.

Therefore, the present invention can provide a mobile radio terminal capable of preventing establishment of the communication for a function which cannot be executed by the software.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a configuration of a mobile radio terminal according to an embodiment of the present invention;

FIG. 2 is a flowchart showing operations of the mobile radio terminal shown in FIG. 1.

DETAILED DESCRIPTION OF THE INVENTION

Figure 3:
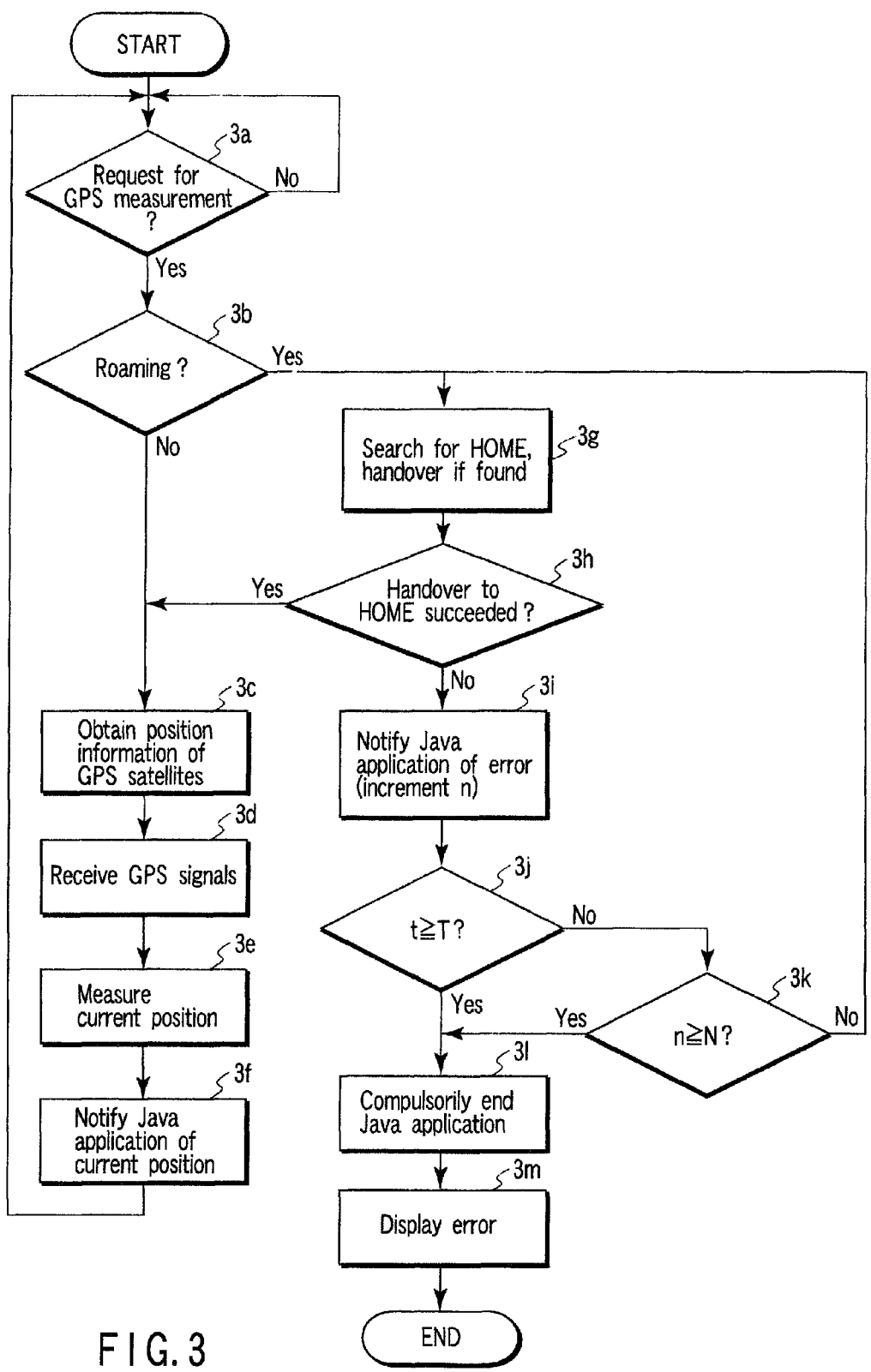
FIG. 3 is a flowchart showing operations of the mobile radio terminal shown in FIG. 1.

An embodiment of the present invention will be described with reference to the accompanying drawings.

FIG. 1 shows a configuration of a mobile radio terminal 100 according to the embodiment of the present invention. The mobile radio terminal 100 comprises an antenna 1, a communication unit 10, a speech processing unit 20, a display unit 30, an operation unit 40, a notifying unit 50, a memory unit 60, a camera unit 70, a GPS (Global Positioning System) receiving unit 80, and a control unit 90. The mobile radio terminal 100 implements speech communications and data communications by conducting radio communications with radio base stations BS1, BS2 and the like.

BS1 is a radio base station of a carrier (hereinafter called a contract carrier) with which the mobile radio terminal 100 is under contract (for service subscription), and is accommodated in a mobile communication network NW1 of the contract carrier. BS2 is a radio base station of a carrier (hereinafter called a roaming carrier) which can execute roaming with the contract carrier, and is accommodated in a mobile communication network NW2 of the roaming carrier to execute radio communications with the mobile radio terminal 100 by roaming.

The carriers comprise the radio base stations BS1 and BS2, respectively. However, each of the contract carrier and the roaming carrier comprises a number of radio base stations. The radio base station BS1 of the contract carrier comprises a function of executing radio communications with the mobile radio terminal 100 and providing the mobile radio terminal 100 with position information of GPS (Global Positioning System) satellites ST1 to STn, in response to a request from the mobile radio terminal 100. On the other hand, the roaming carrier cannot provide the mobile radio terminal 100 connected by the roaming with the service using the position information.

The antenna 1 receives radio signals transmitted from the radio base stations BS1 and BS2, and sends radio signals from the mobile radio terminal 100 to the radio base stations BS1 and BS2.

The communication unit 10 establishes radio communication with the radio base stations BS1 and BS2 via the antenna 1, and executes communication in the mobile communication networks NW via the radio base stations BS1 and BS2. More specifically, the communication unit 10 down-converts and demodulates the radio signals received by the antenna 1, to obtain data sent from the partner stations. In addition, the communication unit 10 modulates the baseband signals with the data supplied from the control unit 90, generates radio signals by up-converting the baseband signals, and sends the generated radio signals to the radio base stations BS1 and BS2 via the antenna 1.

The speech processor 20 regenerates speech signals by decoding encoded speech data, of the data demodulated by the communication unit 10, and outputs the speech signals from a built-in speaker 21. The speech sent from the partner stations is thereby transmitted to the user. In addition, the speech processor 20 generates encoded speech data by encoding speech signals input from a built-in microphone 22, and supplies the generated encoded speech data to the communication unit 10 via the control unit 90.

The display unit 30 is a display unit employing an LCD (Liquid Crystal Display) or the like, which displays to the user various kinds of visual information such as texts, images, images taken by the camera unit 70, videophone images received from partner stations and the like. The operating unit 40 comprises a plurality of key switches to accept user's requests. The notifying unit 50 notifies the user of incoming calls by sounds.

The memory unit 60 stores control programs and control data of the control unit 90, preinstalled application software, and application software such as Java downloaded arbitrarily by the user, together with telephone directory data associated with telephone numbers, names and image data such as face pictures, and mail data which have been sent and received.

The camera unit 70 is a digital camera comprising image pickup devices such as CCD (Charge-Coupled Device), CMOS (Complementary Metal Oxide Semiconductor) or the like, configured to take still images and videophone moving images.

The GPS receiving unit 80 receives GPS signals sent from the GPS satellites ST1 to STn and detects information included in the GPS signals (GPS satellite identification information indicating the sender, information indicating sending time, and the like).

The control unit 90 controls all the units of the mobile radio terminal 100, and operates on the basis of the control programs and control data stored in the memory unit 60. For example, the control unit 90 comprises an incoming call controlling function of controlling the communication unit 10 to receive incoming call signals from the radio base stations BS of the system employed to wait for incoming calls controlling the display unit 30 and the notifying unit 50 to notify the user of occurrence of the incoming calls upon receiving the incoming call signals, urging the communication unit 10 to send signals responding to the incoming calls, and establishing a communication link for executing the speech communication and videophone.

In addition, control unit 90 has a function of measuring the time by obtaining information on an exact current time from the radio base stations, and various kinds of functions of reading and executing the application software stored in the memory unit 60 in response to the user's request when a preset time has come.

For example, when the control unit 90 executes application software using position information, the control unit 90 controls the communication unit 10 to obtain position information of the GPS satellites ST1 to STn from the radio base station BS1, controls the GPS receiving unit 80 to receive the GPS signals, and measures a latitude and a longitude of the mobile radio terminal 100 (together with a height if the number of GPS satellites is four or more) on the basis of the position information, current time information and information detected by the GPS receiving unit 80 (GPS satellite identification information indicating the sender, sending time information and the like) (hereinafter called GPS measurement).

Besides these, the control unit 90 comprises a function of executing the application software stored in the memory unit 60 and controlling the communication unit 10 to connect to the Internet and browse homepages and Web sites, a function of sending and receiving electronic mails, a function of displaying the information (Web sites and electronic mails) obtained by the communications through the Internet on the display unit 30, a function of controlling the camera unit 70 to take still images and moving images, a function of displaying the taken images on the display unit 30, a function of exchanging images and speech with the communication partner to implement the videophone, and the like.

Next, operations of the mobile radio terminal having the above-described configuration are described. In the following descriptions, explanations of control operations such as sending and receiving signals to execute general speech communication, executing speech communications, sending and receiving electronic mails, and the like are omitted, and operations at executing application software such as Java and the like are explained. This process is implemented by executing control of a flowchart shown in FIG. 2 on the basis of the control program and control data stored in the memory unit 60 by the control unit 90 when the application software is executed.

First, in step 2a, the control unit 90 discriminates whether or not the active application software has requested the GPS measurement. If the active application software has requested the GPS measurement, the operation shifts to step 2b. If the active application software has not, the control unit 90 monitors again generation of the request in step 2a. In addition, if the control unit 90 discriminates that the active application software has requested the GPS measurement, the control unit 90 resets error counter n and starts timer t. If the timer t has been started, the control unit 90 restarts the timer t.

In step 2b, the control unit 90 discriminates whether or not the radio base station currently employed to wait for incoming calls is a roaming carrier, i.e. whether or not the mobile radio terminal is roaming. If the mobile radio terminal is roaming (i.e. if the mobile radio terminal is waiting for incoming calls via the radio base station BS2 of the roaming carrier), the operation shifts to step 2g. If the mobile radio terminal is not roaming (i.e. if the mobile radio terminal is waiting for incoming calls via the radio base station BS1 of the contract carrier), the operation shifts to step 2c. Discriminating whether or not the radio base station is roaming is executed on the basis of the identification information sent from the radio base station employed to wait for incoming calls.

In step 2c, the control unit 90 controls the communication unit 10 to obtain the position information of the GPS satellites ST1 to STn from the radio base station BS1 and shifts to step 2d.

In step 2d, the control unit 90 controls the GPS receiving unit 80 to receive the GPS signals and shifts to step 2e. The GPS receiving unit 80 thereby detects the GPS satellite identification information indicating the sender, sending time information and the like from the received GPS signals and outputs these information items to the control unit 90.

In step 2e, the control unit 90 calculates (or may urge an external server not shown to calculate) the latitude and the longitude of the mobile radio terminal 100 (together with the height if the number of GPS satellites is four or more) on the basis of the position information of the GPS satellites ST1 to STn, the current time information and the information detected by the GPS receiving unit 80 (GPS satellite identification information indicating the sender, sending time information and the like) (hereinafter called GPS measurement), and shifts to step 2f.

In step 2f, the control unit 90 notifies the active application software of the information on the current position measured in step 2e, and shifts to step 2a. The active application software thereby executes the process using the information of the current position.

On the other hand, in step 2g, the control unit 90 notifies the application software of an error indicating that the position information cannot be obtained (failure of measurement), before the communication is established by the application software. This is because the position information cannot be obtained (or the service using the position information cannot be received) due to the roaming.

Thus, establishment of the communication in which the function cannot be performed is prevented by the application software. The control unit 90 increments the value of error counter n by "1" and shifts to step 2h.

In step 2h, the control unit 90 discriminates whether or not the value of the timer t started in step 2a has passed preset time T, i.e. whether or not the preset time T has elapsed since generation of the request for the GPS measurement. If the time T has elapsed, the operation shifts to step 2k. If the time T has not elapsed, the operation shifts to step 2i.

In step 2i, the control unit 90 discriminates whether or not the value of error counter n is preset threshold value N or more, i.e. whether or not the error notification has been executed at N times or more during the roaming in step 2g. If the value of error counter n is preset threshold value N or more, the operation shifts to step 2k. If the value of error counter n is smaller than the threshold value N, the operation shifts to step 2j.

In step 2j, the control unit 90 controls the communication unit 10 to search for the radio base station of the contract carrier (for example, BS1) that can be employed to wait for incoming calls. If the radio base station is found, handover is executed. After the handover or in a case where the radio base station is not found, the operation shifts to step 2b.

In step 2k, the control unit 90 compulsorily ends the active application software and shifts to the step 2l.

In step 2l, the control unit 90 urges the display unit 30 to make display indicating that the active application software has been compulsorily ended and that the service using the GPS measurement cannot be received due to the roaming, notifies the user of these matters and ends this process.

As described above, if the mobile radio terminal 100 having the above-described configuration is roaming when the active software makes the request for measuring the position information, the GPS measurement is not executed, the software is notified of the error indicating failure of the measurement and, therefore, establishment of the communication for the function which cannot be executed by the software is prevented. Thus, as the communication for the function which cannot be executed is not established during the roaming, payment of unnecessary communication expenses can be restricted.

In addition, when the request for measurement is made during the roaming, the mobile radio terminal notifies the software of the error, searches for the radio base station (for example, BS1) of the contract carrier and attempts handover to the radio base station. For this reason, if the radio base station of the contract carrier can be employed due to the handover, the user can receive the service using the software without any especial operations.

Then, when the request for measurement is made during the roaming, the mobile radio terminal notifies the software of the error and attempts handover to the radio base station of the contract carrier as described above. If the attempt is continued for the preset time T or more or for the preset count N or more, the mobile radio terminal compulsorily ends the software and notifies the user of the ending and the reason therefor. For this reason, if the handover to the radio base station of the contract carrier cannot be executed, a loop state of continuously causing errors can be prevented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents. For example, the Java application has been explained with reference to FIG. 2 but may be replaced with the other applications.

In addition, in the above embodiment, for example, when it is discriminated in step 2b that the mobile radio terminal is roaming, error notification is executed in step 2g to indirectly prevent an upper software from establishing the communication. Instead of this, however, when it is discriminated in step 2b that the mobile radio terminal is roaming, the operation may shift directly to step 2k, compulsorily end the software and deny the communication request from the software. Even in this process, as the communication for the function which cannot be executed is not established during the roaming, payment of unnecessary communication expenses can be restricted.

In addition, in the above embodiment, the mobile radio terminal 100 measures the position of the mobile radio terminal 100 by employing the GPS receiving unit 80 in steps 2c to 2e. Instead of this, for example, the present invention can also be applied to a case of obtaining the position information of the mobile radio terminal 100 from the GPS server in the mobile communication network NW. Even in this measuring system, as the communication for the function which cannot be executed is not established during the roaming, payment of unnecessary communication expenses can be restricted.

Instead of the process shown in FIG. 2, a process shown in FIG. 3 may be executed. Similarly to the process shown in FIG. 2, the process shown in FIG. 3 is executed by the control unit 90 on the basis of the control program and control data stored in the memory unit 60 when the application software is executed. Next, this process is described below with reference to FIG. 3.

First, in step 3a, the control unit 90 discriminates whether or not the active application software has requested the GPS measurement. If the active application software has requested the GPS measurement, the operation shifts to step 3b. If the active application software has not, the control unit 90 monitors again generation of the request in step 3a. In addition, if the control unit 90 discriminates that the active application software has requested the GPS measurement, the control unit 90 resets the value of the error counter n and starts the timer t. If the timer t has been started, the control unit 90 restarts the timer t.

In step 3b, the control unit 90 discriminates whether or not the radio base station currently employed to wait for incoming calls is a roaming carrier, i.e. whether or not the mobile radio terminal is roaming. If the mobile radio terminal is roaming (i.e. if the mobile radio terminal is waiting for incoming calls via the radio base station BS2 of the roaming carrier), the operation shifts to step 3g. If the mobile radio terminal is not roaming (i.e. if the mobile radio terminal is waiting for incoming calls via the radio base station BS1 of the contract carrier), the operation shifts to step 3c. Discriminating whether or not the radio base station is roaming is executed on the basis of the identification information sent from the radio base station employed to wait for incoming calls.

In step 3c, the control unit 90 controls the communication unit 10 to obtain the position information of the GPS satellites ST1 to STn from the radio base station BS1 and shifts to step 3d.

In step 3d, the control unit 90 controls the GPS receiving unit 80 to receive the GPS signals and shifts to step 3e. The GPS receiving unit 80 thereby detects the GPS satellite identification information indicating the sender, sending time information and the like from the received GPS signals and outputs these information items to the control unit 90.

In step 3e, the control unit 90 calculates the latitude and the longitude of the mobile radio terminal 100 (together with the height if the number of GPS satellites is four or more) on the basis of the position information of the GPS satellites ST1 to STn, the current time information and the information detected by the GPS receiving unit 80 (GPS satellite identification information indicating the sender, sending time information and the like), and shifts to step 3f.

In step 3f, the control unit 90 notifies the active application software of the information on the current position measured in step 3e, and shifts to step 3a. The active application software thereby executes the process using the information of the current position.

In step 3g, the control unit 90 controls the communication unit 10 to search for the radio base station of the contract carrier (for example, BS1) that can be employed to wait for incoming calls. If the radio base station is found, handover is executed. After the handover or in a case where the radio base station is not found, the operation shifts to step 3h.

In step 3h, the control unit 90 discriminates whether or not the handover to the radio base station (for example, BS1) of the contract carrier has been successful in step 3g. If the handover to the radio base station of the contract carrier has been successful, the control unit 90 shifts to step 3c to execute the GPS measurement. However, if the handover has been unsuccessful, the control unit 90 shifts to step 3i.

In step 3i, the control unit 90 cannot obtain the position information (or cannot receive the service using the position information) due to the roaming and thereby notifies the application software of an error indicating that the position information cannot be obtained (failure of measurement), prior to the communication of the application software. Thus, establishment of the communication in which the function cannot be performed is prevented by the application software. The control unit 90 increments the value of error counter n by "1" and shifts to step 3j.

In step 3j, the control unit 90 discriminates whether or not the value of the timer t started in step 3a has passed preset time T, i.e. whether or not the preset time T has elapsed since generation of the request for the GPS measurement. If the time T has elapsed, the operation shifts to step 3l. If the time T has not elapsed, the operation shifts to step 3k.

In step 3k, the control unit 90 discriminates whether or not the value of error counter n is preset threshold value N or more, i.e. whether or not the error notification has been executed at N times or more in step 3l during the roaming. If the value of error counter n is preset threshold value N or more, the control unit 90 shifts to step 3l. If the value of error counter n is smaller than the threshold value N, the control unit 90 shifts to step 3g and attempts again the handover to the radio base station of the contract carrier.

In step 3l, the control unit 90 compulsorily ends the active application software and shifts to the step 3m.

In step 3m, the control unit 90 urges the display unit 30 to make display indicating that the active application software has been compulsorily ended and that the service using the GPS measurement cannot be received due to the roaming, notifies the user of these matters and ends this process.

According to the above process, when the active software makes a request for measurement of the position information, the mobile radio terminal 100 attempts the handover to the radio base station of the contract carrier. If the handover is successful, the mobile radio terminal 100 can execute the function of the software by the general GPS measurement. On the other hand, if the handover is unsuccessful, the mobile radio terminal 100 can prevent establishment of the communication for the function which cannot be executed by the software by notifying the software of the error indicating the measurement failure. For this reason, as the communication for the function which cannot be executed is not established during the roaming, payment of unnecessary communication expenses can be restricted.

In the above embodiment, the mobile radio terminal 100 measures the position of the mobile radio terminal 100 by employing the GPS receiving unit 80 in steps 3c to 3e. Instead of this, for example, the embodiment can also be applied to a case of obtaining the position information of the mobile radio terminal 100 from the GPS server in the mobile communication network NW. In such a measurement system, too, as communication for the function which cannot be executed during the roaming is not established, payment of unnecessary communication expenses can be restricted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile radio terminal comprising:
a communication unit configured to establish radio communication with a base station;
a memory unit configured to store an application;
a control unit configured to:
execute the application stored in the memory unit;
receive, from the application, a request to obtain the current position of the mobile radio terminal;
determine, when the mobile radio terminal is in radio communication with a base station of a contract carrier, that the mobile radio terminal is not roaming or, when the communication unit is in radio communication with a base station of a roaming carrier, that the mobile radio terminal is roaming;

obtain the current position of the mobile radio terminal, and provide the current position of the mobile radio terminal to the application, if the mobile radio terminal is not roaming; and notify the application that that the current position of the mobile radio terminal cannot be obtained if the mobile radio terminal is roaming.

2. The mobile radio terminal according to claim 1, wherein the control unit is further configured to:

compulsorily end the execution of the application if the mobile radio terminal is roaming.

3. The mobile radio terminal according to claim 2, wherein the control unit is further configured, prior to compulsorily ending the execution of the application, to:

determine that at least a preset time has elapsed since the request to obtain the current position of the mobile radio terminal was received from the application; or determine that the application has been notified at least a present number of times that the current position of the mobile radio terminal cannot be obtained.

4. The mobile radio terminal according to claim 1, wherein the control unit is further configured, if the mobile radio terminal is roaming, to:

search for a base station of the contract carrier; and if the base station of the contract carrier is found, execute a handover from the base station of the roaming carrier to the base station of the contract carrier.

5. The mobile radio terminal according to claim 4, wherein the control unit is further configured, prior to searching for the base station of the contract carrier, to:

determine that at least a preset time has elapsed since the request to obtain the current position of the mobile radio terminal was received from the application; or determine that the application has been notified at least a present number of times that that the current position of the mobile radio terminal cannot be obtained.

6. The mobile radio terminal according to claim 1, wherein:

the mobile radio terminal further comprises a global positing system (GPS) receiving unit configured to receive GPS signals sent from satellites; and the control unit is configured to obtain the current position of the mobile radio terminal if the mobile radio terminal is not roaming by calculating the current position of the mobile radio terminal based at least in part on the GPS signals received by the GPS receiving unit.

7. A mobile radio terminal comprising:

a communication unit configured to establish radio communication with a base station;

a memory unit configured to store an application;

a control unit configured to:

execute the application stored in the memory unit;

receive, from the application, a request to obtain the current position of the mobile radio terminal;

determine, when the mobile radio terminal is in radio communication with a base station of a contract carrier, that the mobile radio terminal is not roaming or, when the communication unit is in radio communication with a base station of a roaming carrier, that the mobile radio terminal is roaming;

obtain the current position of the mobile radio terminal, and provide the current position of the mobile radio terminal to the application, if the mobile radio terminal is not roaming; and if the mobile radio terminal is roaming, search for a base station of the contract carrier and, if the base station of the contract carrier is found, execute a handover from the base station of the roaming carrier to the base station of the contract carrier.

8. The mobile radio terminal according to claim 7, wherein the control unit is further configured, prior to searching for the base station of the contract carrier, to:

determine that a preset time has not elapsed since the request to obtain the current position of the mobile radio terminal was received from the application; and determine that the application has not been notified at least a present number of times that that the current position of the mobile radio terminal cannot be obtained.

9. The mobile radio terminal according to claim 7, wherein:

the mobile radio terminal further comprises a global positing system (GPS) receiving unit configured to receive GPS signals sent from satellites; and the control unit is configured to obtain the current position of the mobile radio terminal if the mobile radio terminal is not roaming by calculating the current position of the mobile radio terminal based at least in part on the GPS signals received by the GPS receiving unit.

10. A communication method for a mobile radio terminal and an application executed on the mobile radio terminal, the method comprising:

receiving, from the application, a request to obtain the current position of the mobile radio terminal;

determining, when the mobile radio terminal is in radio communication with a base station of a contract carrier, that the mobile radio terminal is not roaming or, when the communication unit is in radio communication with a base station of a roaming carrier, that the mobile radio terminal is roaming;

obtaining the current position of the mobile radio terminal, and providing the current position of the mobile radio terminal to the application, if the mobile radio terminal is not roaming; and notifying the application that that the current position of the mobile radio terminal cannot be obtained if the mobile radio terminal is roaming.

11. The communication method according to claim 10, further comprising:

compulsorily ending the execution of the application if the mobile radio terminal is roaming.

12. The communication method according to claim 11, further comprising, prior to compulsorily ending the execution of the application:

determining that at least a preset time has elapsed since the request to obtain the current position of the mobile radio terminal was received from the application; or determining that the application has been notified at least a present number of times that the current position of the mobile radio terminal cannot be obtained.

13. The communication method according to claim 12, further comprising:

displaying an error message on a display unit of the mobile radio terminal indicating that the application software has been compulsorily ended and that the current position of the mobile radio terminal cannot be obtained since the mobile radio terminal is roaming.

14. The communication method according to claim 10, further comprising, if the mobile radio terminal is roaming:

searching for a base station of the contract carrier; and if the base station of the contract carrier is found, executing a handover from the base station of the roaming carrier to the base station of the contract carrier.

15. The communication method according to claim 14, further comprising, prior to searching for the base station of the contract carrier:

determining that at least a preset time has elapsed since the request to obtain the current position of the mobile radio terminal was received from the application; or determining that the application has been notified at least a present number of times that that the current position of the mobile radio terminal cannot be obtained.

16. The communication method according to claim 10, wherein:

obtaining the current position of the mobile radio terminal if the mobile radio terminal is not roaming includes calculating the current position of the mobile radio terminal based at least in part on GPS signals sent from satellites and received by a GPS receiving unit of the mobile radio terminal.

17. A communication method for a mobile radio terminal and an application executed on the mobile radio terminal, the method comprising:

receiving, from the application, a request to obtain the current position of the mobile radio terminal;

determining, when the mobile radio terminal is in radio communication with a base station of a contract carrier, that the mobile radio terminal is not roaming or, when the communication unit is in radio communication with a base station of a roaming carrier, that the mobile radio terminal is roaming;

obtaining the current position of the mobile radio terminal, and providing the current position of the mobile radio terminal to the application, if the mobile radio terminal is not roaming; and if the mobile radio terminal is roaming, searching for a base station of the contract carrier and, if the base station of the contract carrier is found, executing a handover from the base station of the roaming carrier to the base station of the contract carrier.

18. The communication method according to claim 17, further comprising, prior to searching for the base station of the contract carrier:

determining that a preset time has not elapsed since the request to obtain the current position of the mobile radio terminal was received from the application; and determining that the application has not been notified at least a present number of times that that the current position of the mobile radio terminal cannot be obtained.

19. The communication method according to claim 17, wherein:

obtaining the current position of the mobile radio terminal if the mobile radio terminal is not roaming includes calculating the current position of the mobile radio terminal based at least in part on GPS signals sent from satellites and received by a GPS receiving unit of the mobile radio terminal.

\* \* \* \* \*